United States Patent [19]

Macovski

[11] Patent Number: 4,463,375

[45] Date of Patent: Jul. 31, 1984

[54] MULTIPLE-MEASUREMENT NOISE-REDUCING SYSTEM

[75] Inventor: Albert Macovski, Menlo Park, Calif.

[73] Assignee: The Board of Trustees of the Leland Standford Junior University, Stanford, Calif.

[21] Appl. No.: 415,334

[22] Filed: Sep. 7, 1982

[51] Int. Cl.³ .............................................. H04N 7/18
[52] U.S. Cl. ...................................... 358/111; 358/36; 358/167; 364/414; 378/99
[58] Field of Search .................. 358/111, 36, 167, 282, 358/284; 378/99; 364/414

[56] References Cited

U.S. PATENT DOCUMENTS

| | | | |
|---|---|---|---|
| 2,833,851 | 5/1958 | Loughlin | 358/39 |
| 4,029,963 | 6/1977 | Alverez | 250/360 |
| 4,064,530 | 12/1977 | Kaiser | 358/167 |
| 4,181,917 | 1/1980 | Richman | 358/36 |
| 4,229,764 | 10/1980 | Panos | 358/111 |
| 4,367,490 | 1/1983 | Riederer | 358/167 |
| 4,409,615 | 10/1983 | McMann | 358/111 |

Primary Examiner—Howard W. Britton
Attorney, Agent, or Firm—Flehr, Hohbach, Test, Albritton & Herbert

[57] ABSTRACT

In a multiple-measurement system, a weighted sum of the measurements is used to provide a selective image. An additional weighted sum is used to provide an increased signal-to-noise ratio of some desired parameter of the image. The high frequency components of the increased signal-to-noise ratio image are combined with the low frequency components of the selective image to provide a selective image with improved signal-to-noise ratio. The combining operation can utilize the ratios of the derivatives in each signal to provide the correct amount of high frequency signal at each transition.

41 Claims, 10 Drawing Figures

MULTIPLE-MEASUREMENT NOISE-REDUCING SYSTEM

BACKGROUND OF THE INVENTION

1. Field of the Invention

This invention relates to x-ray imaging systems. In a primary application the invention relates to the processing of images derived from a plurality of x-ray measurements.

2. Description of Prior Art

In many imaging application areas, images are constructed as a weighted sum of a plurality of measurements. A prime example are the recent new developments in x-ray imaging. Here measurements are made at different energies and/or at different times. These measurements are then combined to provide selective images representing specific materials.

One example is that of temporal subtraction techniques using digital radiography as described in the publication by C. A. Mistretta and A. B. Crummy, "Diagnosis of Cardiovascular Disease by Digital Subtraction Angiography," in *Science*, Vol. 214, pp. 761–65, 1981. Here measurements taken before and after the administration of iodine into blood vessels are subtracted to provide an image of vessels alone. Another example is that of energy-selective radiography as described in the publication by L. A. Lehmann, et al., "Generalized Image Combinations in Dual KVP Digital Radiography," in *Medical Physics*, Vol. 8, pp. 659–67, 1981. Here measurements made at different energies are combined to enhance or eliminate specific materials. A third example is energy-selective computerized tomography as described in the publication by R. E. Alvarez and A. Macovski, "Energy-Selective Reconstructions in X-ray Computerized Tomography," in *Physics in Medicine & Biology*, Vol. 21, pp. 733–744, 1976. Here sets of measurements are made at two energy spectra and distortion-free reconstructions are made which delineate the average atomic number and density of each region. A fourth example is hybrid subtraction described in U.S. application Ser. No. 6-260,694, filed May 5, 1981 and in the publication by W. R. Brody, "Hybrid Subtraction for Improved Intravenous Arteriography," in *Radiology*, Vol. 141, pp. 828–831, 1981. Here dual energy measurements are made before and after the administration of iodine. Each dual energy pair is used to eliminate soft tissue. In this way the resultant subtracted vessel images are immune to soft tissue motion.

In each case, where a number of measurements are combined to select specific material properties, the resultant SNR (signal-to-noise ratio) is reduced as compared to the nonselective image. Therefore, these various processing techniques which improve the visualization of disease processes by selecting specific materials have the disadvantage of a reduction in SNR. This reduced SNR can interfere with the ability to visualize regions of disease.

The techniques employed in the present invention are generally related to those employed in color television systems for bandwidth reduction. In color television the high frequency components for all three color channels are derived from the luminance signal. Systems for adding the correct amount of high frequency component to each color channel are described in U.S. Pat. No. 2,833,851 issued to Loughlin and U.S. Pat. No. 4,181,917 issued to Richman. These patents do not, however, address the problem of excessive noise in a selective image derived from a plurality of measurements, such as occurs in many x-ray imaging systems.

SUMMARY OF THE INVENTION

An object of this invention is to provide a system for improving the signal-to-noise ratio in images derived from a plurality of measurements.

A further object of the invention is to improve the signal-to-noise ratio of material-selective x-ray images.

Another object of the invention is to improve the signal-to-noise ratio in blood vessel images where measurements are taken with and without the presence of a constrast agent.

Yet another object of the invention is to improve the signal-to-noise ratio of computerized tomography images derived from two or more measurements.

Briefly, in accordance with the invention, an array of measurements are taken of an object under different conditions. These are combined to select a specific aspect of the object. The same measurements are then combined in different weightings to provide a lower-noise image, without the desired selectivity. The improved selective image is formed by combining the selective image with the lower noise image using the lower frequency components of the former and the higher frequency components of the latter. To assure the proper amplitude of the higher frequency components, the components are weighted with the ratio of the derivative of the selective image to the derivative of the lower noise image. Nonlinear thresholds are used for those cases where this ratio becomes an unreliable indicator of the correct amplitude of the high frequency components.

BRIEF DESCRIPTION OF THE DRAWINGS

For a more complete disclosure of the invention, reference may be made to the following description of several illustrative embodiments thereof which is given in conjunction with the accompanying drawing, of which.

Figure 1:
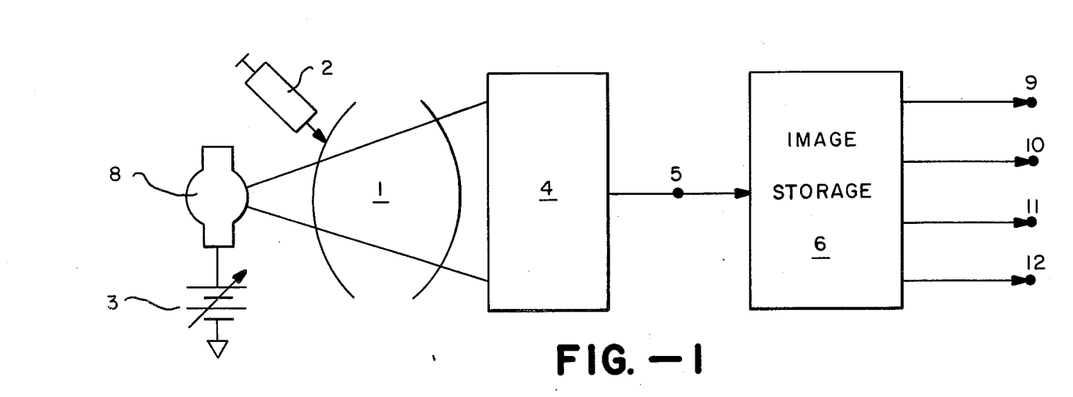
FIG. 1 is a block diagram of an x-ray system for acquiring signals useful in the invention.

FIG. 1 is a block diagram of an x-ray system useful in one embodiment of the invention. X-ray source 8 is an x-ray tube supplied by variable voltage power source 3. The x-rays are transmitted through object 1, normally the human anatomy. The transmitted rays are received by x-ray detector 4, such as an image intensifier and television camera, or a one or two-dimensional array of scintillators, etc. The image signal 5 is applied to image storage system 6 where a plurality of images 9, 10, 11, 12, etc., can be stored.

In temporal subtraction a first image 9 is stored. Following administration of a contrast agent using syringe 2, a second image 10 is stored. These are then used in the subsequent processing systems. In energy selective systems, images 9, 10, 11, 12, etc., are stored at different values of beam energy corresponding to different anode voltages 3. In dual-energy systems, two voltages are used. In addition different x-ray beam filters, not shown, can be added.

In a hybrid subtraction system previously described measurements at two voltages are taken prior to the administration of contrast material. These are stored as 9 and 10. Following administration of the contrast agent, two additional measurements at the same two voltages are taken and stored as 11 and 12. These four measurements are then processed to obtain a low-noise image of the vessels opacified by the contrast material from syringe 2.

Figure 2:
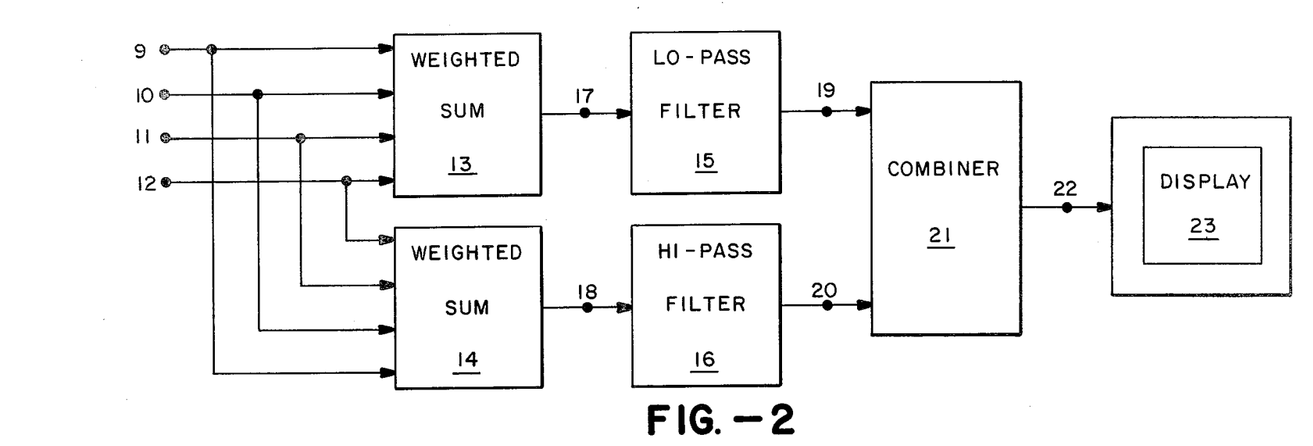
FIG. 2 is a block diagram of an embodiment of the invention.

Referring now to FIG. 2, the lines 9, 10, 11 and 12 representing an array of x-ray measurements of an object, are processed in accordance with the invention. These signals could be obtained, for example, from the output of the television camera in a fluoroscopic system where an array of images are formed and stored, for example, on a magnetic disc or in a solid-state frame memory. These signals can represent x-ray images taken with different photon energy spectra or taken before and after the administration of a contrast agent.

In general the multiple measurements are taken so as to provide the isolation or elimination of specific materials. One simple example involves the isolation of vessel images by subtracting measurements taken before and after the administration of an iodinated contrast agent. Other examples include measurements at different x-ray photon energy spectra which are then combined to eliminate or enhance specific materials.

Weighted summer 13 takes the measurements and provides selective signal 17, containing the desired material properties. Unfortunately, however, signal 17 often has relatively poor SNR. The weighted sum usually involves negative weights which diminish the signal. The noise variances of each independent measurement add, however, to provide a large variance, hence a low SNR. This SNR is considerably improved using low pass filter 15 which reduces the bandwidth. This noise reduction, however, is accomplished at the price of reduced resolution. A primary objective of this invention to restore the resolution using a source of high-frequency information with reduced noise.

Signals 9, 10, 11 and 12 are also applied to weighted summing structure 14. These weights are chosen to maximize the signal-to-noise ratio for a particular component of the image. For example, for vessel imaging they are chosen to maximize the signal-to-noise ratio for the iodinated contrast agent. This is in sharp distinction to weighted summing structure 13 where the weights are chosen to isolate iodine and eliminate the various tissue components. Ideally the weights which maximize the SNR will vary in different portions of the image, depending on the intervening tissue. Thus the weights can be varied as the signals are scanned. However, for simplicity, the weights can be fixed to maximize the average SNR with relatively small degradation in performance.

The low SNR weighted-sum signal, 18, is applied to high pass filter 16 which extracts the high frequency components. A preferred embodiment of this high pass filter is the complement of low pass filter 15. Thus the sum of the normalized transmissions equals unity within the frequencies of interest. These filters can either be implemented in the frequency domain or as a convolution functions.

Combiner 21 combines the low frequency image or signal 19 with the high frequency image or signal 20 to obtain the processed image 22 which is displayed in display 23. Since signal 19 is low noise because of the filtering, and signal 20 is low noise because of the weightings, the processed signal 22 is a low noise version of the desired signal, having the full bandwidth or resolution.

The degree of artifacts in the image can depend on the nature of the combiner 21. For simplicity, the combiner 21 can simply be an adder. Here the desired selected image will have the required low noise and high resolution. However, signal 20 contains the high frequency components of undesired structures. For example, in vessel images, signal 20 contains the edges of undesired structures such as bone and various soft tissue organs. Since these are only edges, however, a trained radiologist can ignore them and concentrate on the vessels.

This system is particularly applicable to the previously-described hybrid subtraction scheme. Assume summer 13 weights the four signals to eliminate everything but iodine, while also subtracting soft tissue motion artifacts. Summer 14 can, for example, weight the signals to provide a low noise temporal subtraction, without concern about soft tissue motion artifacts. This can be accomplished by using a large positive weight for the low energy signal before iodine is administered, and a smaller positive weight for the high energy signal since it contains less of the iodine component. These weights are reversed for the measurements taken after the iodine administration to provide a temporal subtraction of everything except iodine.

In this case, in the absence of motion, when 19 and 20 are added, the desired isolated vessel signal will be formed having its full resolution. In the presence of soft tissue motion, signal 19 will be immune and continue to be vessels only, as described in the previously referenced application on hybrid subtraction. Low noise signal 20, however, will contain motion artifacts. Thus when they are added in combiner 21, the edges of these artifacts will be present. This, however, is a relatively mild degradation which the radiologist should be able to ignore. It should be emphasized that, in this illustration, the weights in summer 14 were chosen not to provide the very best SNR, but to provide the best SNR where static tissue is subtracted, thus minimizing the artifacts. The best SNR would involve using only those measurements taken in the presence of iodine.

Mathematically, signal 17 is given by $$S = \sum_i a_i A_i$$

where $A_i$ represents the different measurements and the constants $a_i$ are chosen to select or eliminate a specific material. These same $A_i$ measurements are again combined to form $$M = \sum_i b_i A_i$$

where the $b_i$ factors are chosen to provide an improved SNR, even if undesired components are present. As indicated, it may be desirable to vary the $b_i$ values at different portions of the image to optimize the SNR.

Using the embodiment of FIG. 2, where combiner 21 is simply an adder, the resultant estimate of S, signal 22, is given as $$\hat{S} = S_l + kM_n$$

where $\hat{S}$ is an estimated S signal with improved SNR, $S_l$ is a low pass filtered version of S, signal 19, and $M_n$ is a high pass filtered version of M, signal 20. The constant k represents the ratio of the desired material in the two images, S and M. For example, if the iodine signal is twice as big in S as in M, k would equal 2 to provide the correct high frequency amplitude. If the $b_i$, as previously indicated, are varied in different regions of the image, then k must also be varied accordingly.

As previously indicated, this approach will have artifacts representing edges from $M_n$ of undesired components. In some embodiments, as previously described in hybrid subtraction, the SNR of M is compromised to minimize these artifacts.

Figure 3:
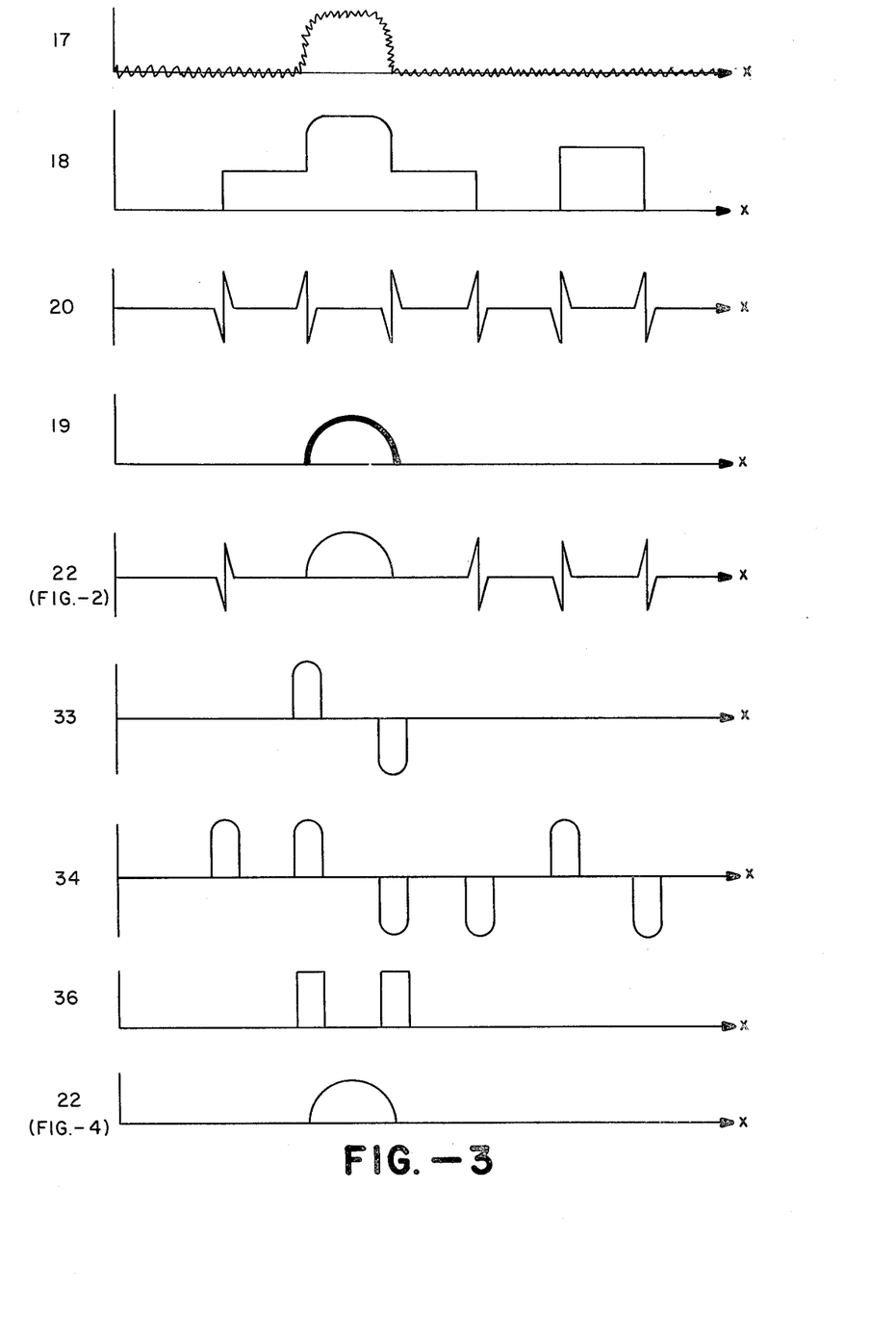
FIG. 3 is an illustration of representative signals used in the invention.

Operation of the system can be had using signals 17–19 of FIG. 3. Signal 17 illustrates the desired isolated vessel image or S signal. Unfortunately, as shown, this signal has a poor SNR. Signal 18 is the M signal containing a good SNR with undesired components. S, not shown, is obtained by adding signal 20 to signal 19, the low frequency version of S, $S_l$. The desired S signal will be restored to its full resolution and the noise will be greatly reduced. However, undesired edge components will exist at the transitions of the undesired components of signal 18.

Figure 4:
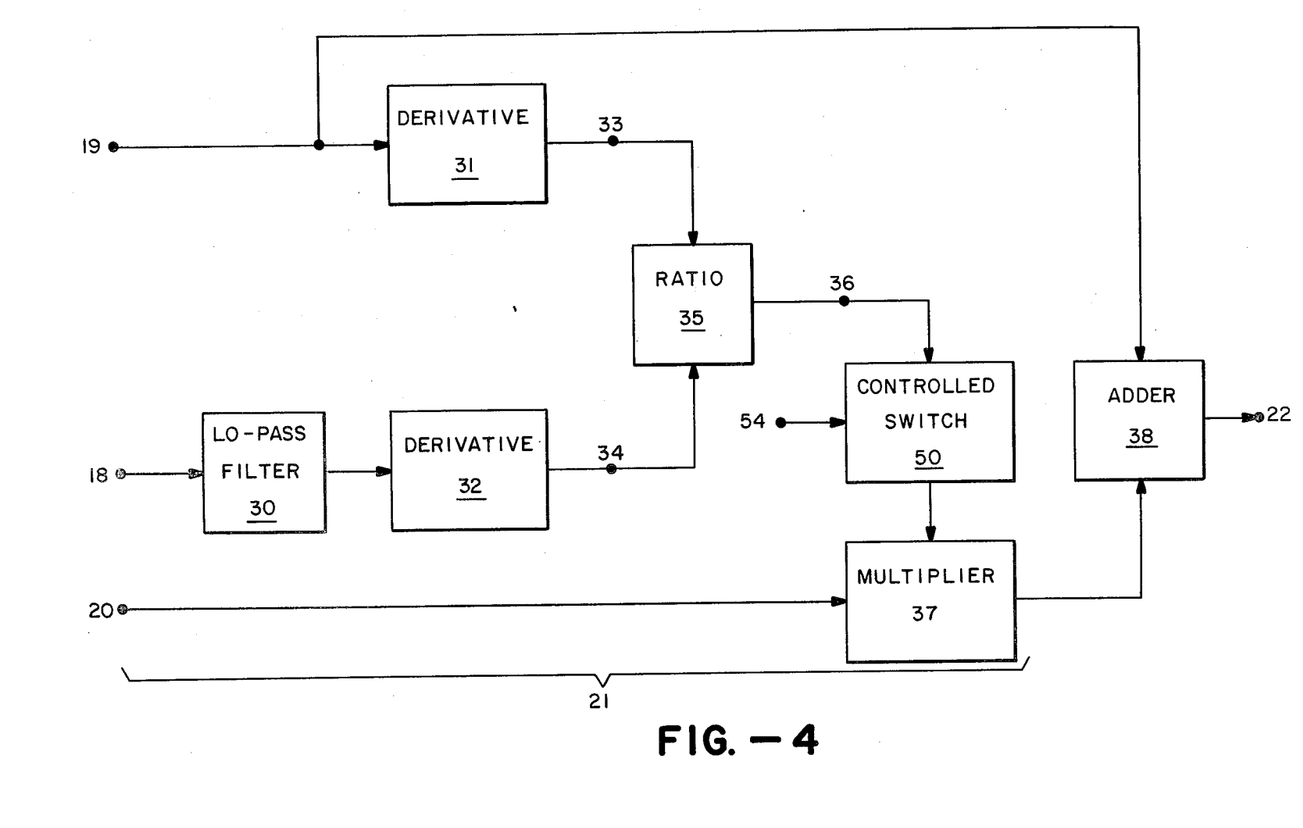
FIG. 4 is a block diagram of an embodiment of a combiner used in the invention.
Figure 5:
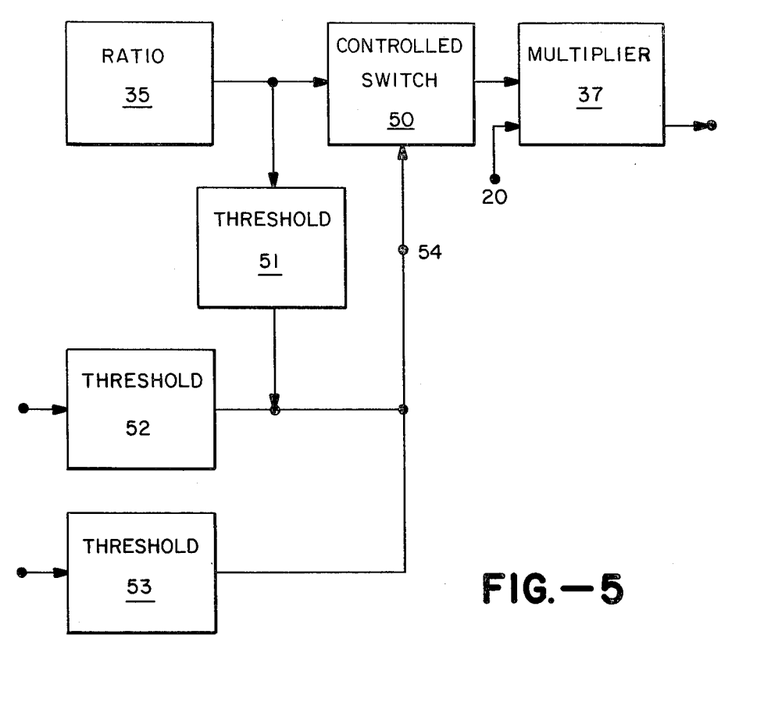
FIG. 5 is a block diagram of a modified combined used in the invention.

The undesired edge components can be eliminated by the alternate combiner system 21 shown in FIG. 4. This system is represented by the equation $$\hat{S} = S_l + \frac{\dot{S}_l}{\dot{M}_l} M_h$$

Here the amount of high frequency information added $M_n$ is controlled by the transitions of $S_l$. Thus transitions in other regions of M will not cause undesired artifacts. To insure that the transitions will be of the correct amplitude we weight $M_n$ by the ratio of the amplitude of the transitions of S, $\dot{S}_l$ to those of M, $\dot{M}_l$. To provide $\dot{S}_l$, the derivative of the low frequency components of S, we take $S_l$, signal 19, take its derivative in 31, to form $\dot{S}_l$, signal 33. The derivative operation can be taken using classic analog operations or be performed as a digital differencing operation. Also, the derivative can be approximated by a high pass or bandpass filter.

Signal $\dot{M}_l$, the derivative of the low frequency components of M, is formed by filtering the M signal 18 with low pass filter 30. This can be identical to filter 15 in FIG. 2. Its derivative is taken in differentiator 32 to form $\dot{M}_l$, signal 34. The ratio of the derivatives is taken in ratio structure 35. This can be accomplished using a digital divider, or by taking the difference of the logs and then taking the exponent or anti-log. The ratio, signal 36, ignoring controlled switch 50, controls the gain of multiplier 37 which varies the amplitude of the added $M_n$.

Referring again to FIG. 3, the ratio of $\dot{S}_l$ 33, to $\dot{M}_l$ 34 is shown as signal 36. This signal selects only the proper amplitude of the transition signals 20 corresponding to S. Thus the product of signal 36 and signal 20 is added to signal 19 in adder 38 to provide the desired $\hat{S}$ signal with low noise and high resolution. The signal is relatively devoid of artifacts since transitions outside of S will not be amplified by ratio signal 36.

In the combiner of FIG. 4 the same low pass filter 15 is used for $S_l$ and $\dot{S}_l$, the derivative signal used to control $M_n$. In general, however, these need not represent the same filter operations. In some cases narrower bandwidth low pass filtering might be used for the differentiated signals considering the noise sensitivity of a ratio operation. In that case additional low pass filtering can be applied between signal 19 and differentiator 31 or between original S signal 17 and differentiator 31. Correspondingly filter 30 can be made narrower band than that of filter 15.

The combiner of FIG. 4, because of the use of a division operation, can become unstable. For example, in a region where $\dot{M}_l$ is very small, $\dot{S}_l$ should be correspondingly small since no transitions are present. However, if $\dot{S}_l$ is corrupted by noise, a huge ratio signal 36 can be developed resulting in high gain for controlled amplifier 37. This could add severe artifacts. FIG. 4 illustrates a nonlinear approach to solving these problems. A controlled switch 50 is used to either enable or prevent control signal 36 from reaching controlled amplifier 37. If controlled switch 50 is disabled by signal 54, high frequency signal 20 is prevented from appearing in the output as signal 22.

Any or all of threshold structures 51, 52 and 53 can be used to provide signal 54 to activate the controlled switch 50. Threshold structure 52 measures $\dot{S}_l$, signal 33, to ascertain if it falls below some predetermined level, such as its r.m.s. noise level. If it does, it is assumed that S has no transitions in that region, and switch 50 is disabled. Similarly if $\dot{M}_l$, signal 34 falls below some relatively low level set in threshold structure 53, it is again assumed that S has no transitions of interest and switch 50 is disabled. In addition if the ratio signal 36 exceeds some absolute level beyond its normal range, the controlled switch is again disabled. Either one of these three prevents most artifacts, and the combination should take care of all contingencies. Care should be taken in the setting of the thresholds to avoid missing desired transitions.

$\dot{S}_l$, signal 33 and $\dot{M}_l$, signal 34 are bipolar signals going both positive and negative. Therefore threshold structures 51, 52 and 53 must ascertain whether the magnitude of the respective signals exceed a given level. This can accomplished by having the threshold structures include an absolute value system, such as a phase splitter followed by a full wave rectifier. Alternatively, the threshold structures themselves can include the appropriate positive and negative threshold settings, thus taking both polarities into account.

In the previously described threshold system, when the threshold was exceeded, multiplier 37 was disabled, providing zero gain, such that the processed signal 22, $\hat{S}$, became simple equal to $S_l$ one potential difficulty with this approach is the loss of high frequency response for very low amplitude signals. For example, in a vessel imaging system, very small vessels might be obliterated since the threshold devices turned off the high-frequency components. One solution to this problem, using the same structure as FIG. 4 is to have controlled switch 50 disable ratio signal 36 and then provide multiplier 37 with a fixed gain, rather than zero gain. This gain could be fixed to provide a signal given by $$\hat{S} = S_l + M_n,$$

providing the correct high frequency amplitude. In this way small structures, such as vessels, would not be obliterated. A limitation of this alternative is that the edges of undesired artifacts would also appear, when the signals became such as to activate the threshold structures. However, this can only result in low-amplitude artifacts, since high-amplitude signals will, by definition, avoid the thresholds.

Figure 6:
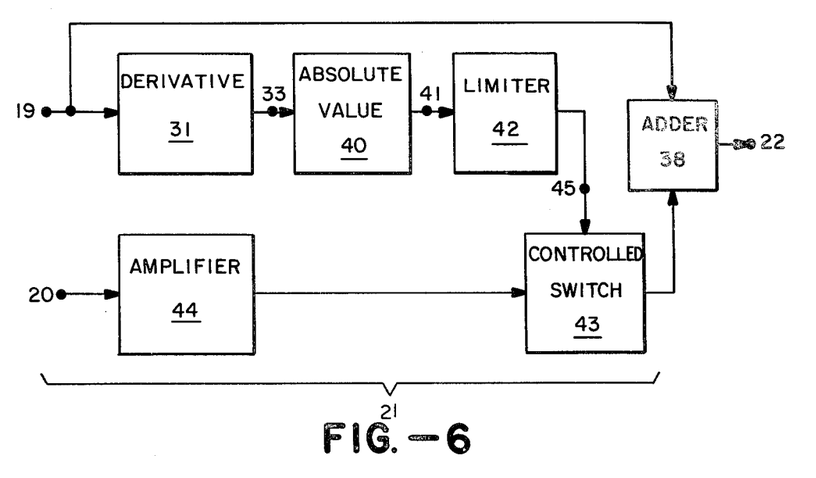
FIG. 6 is a block diagram of an alternate embodiment of a combiner.

The foregoing combining system represents considerable complexity and can function adversely in the presence of noise. FIG. 6 illustrates an alternate combiner 21 which does not involve a ratio operation and is therefore a more stable system. It is particularly of interest in vessel imaging systems. It is, essentially, an improvement over the simplest combiner where the signals are merely added. In essence, where $S_l$ and $M_n$ are added, transitions occur outside of the region of interest. The embodiment of FIG. 4 uses gating of controlled switch 50 to allow transitions solely in the regions of interest, namely, the edges of S.

In one approach, not shown, signal 19 in FIG. 6 is applied directly to limiter 42. This provides a square gating signal wherever signal 19, $S_l$, is non-zero. As can be seen in FIG. 3, only the desired transitions of signal 20, $M_n$, will be gated in by switching on controlled switch 43. The undesired transitions will not appear since they do not coincide with the limited $S_l$ signal.

One problem with this approach is that undesirable transitions occurring in the center of the $S_l$ signal will appear in the output since the controlled switch 43 will be on. This problem can be minimized by gating 43 on only during the desired transition region as shown in the complete FIG. 6 embodiment. Here the derivative $\dot{S}_l$ is applied to an absolute value circuit. This can be a digital implementation or a full-wave rectifier. The absolute value of $\dot{S}_l$ is limited by limiter 42 producing a signal 45 which can be illustrated by signal 36 in FIG. 3. This signal turns on controlled switch 43 only during transitions of the desired S signal. The desired $M_n$ signals are then provided without allowing undesired transitions. These are added to $S_l$ in 38 to provide $\hat{S}$, signal 22.

Amplifier 44, as previously described, provides the correct gain for $M_n$ to be added to $A_l$. If the constants $b_i$ vary for different portions of the image, then amplifier 44 is made a variable gain amplifier whose gain varies with the choice of constants $b_i$ used to produce the M, low-noise, signal.

It will be noted that signal 45, the limited absolute value of $\dot{S}_l$, can also be used to stabilize the embodiment of FIG. 4. Signal 45 is used to provide signal 54 to control controlled switch 50 which applies the ratio signal 36 to multiplier 37. In this way, $M_n$ components outside of the desired transitions will not be passed by controlled amplifier 37 since it will be turned off by switch 50.

One difficulty with the combiner embodiment of FIG. 6, compared with that of FIG. 4, is that the transition signal $M_n$ can be of the wrong polarity. If the various components of M happen to have transitions in the same place, then the M signal can have transitions opposite to that of the desired S signal. Thus the high frequencies $M_n$ gated in by switch 43 would be of the wrong polarity and thus detract from the fidelity. This problem can be solved by the system of FIG. 7.

Figure 7:
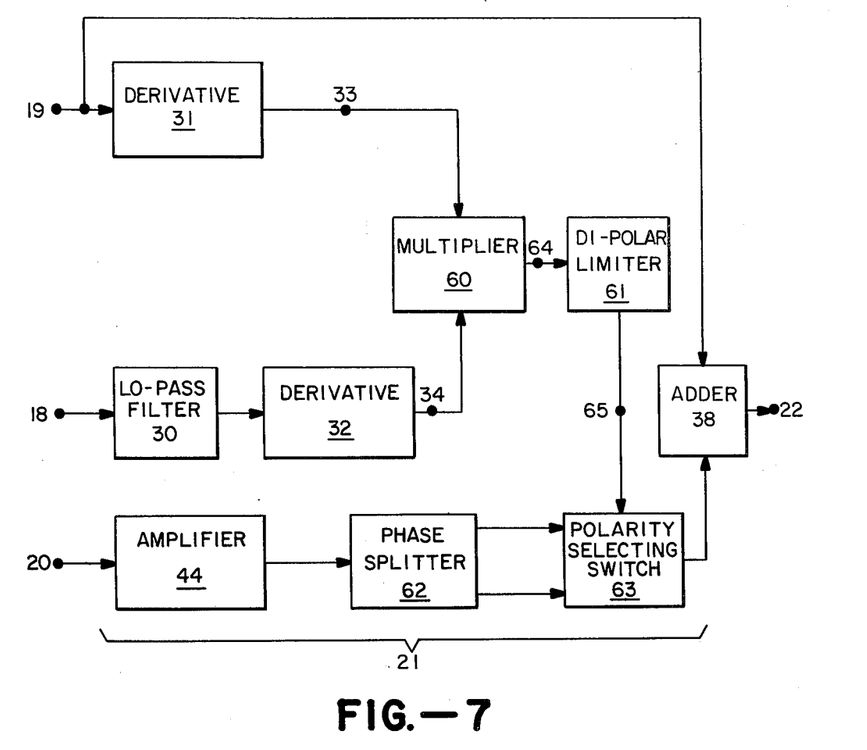
FIG. 7 is a block diagram of an alternate embodiment of a combiner.

Here the two derivative signals previously described $\dot{S}_l$ and $\dot{M}_l$ are multiplied in multiplier 60. If these are of the same polarity, the output will be positive, while if these are of opposite polarity the output will be negative going pulses. These pulses are applied to bipolar limiter 61. This limiter provides the mathematical sign function (e.g., $+1$ or $-1$) providing either a fixed positive or negative output depending on whether the input is positive or negative. A small threshold region can be incorporated to provide zero output when product signal 64 is below a given level. This will avoid triggering by noise.

The bipolar clipped signal is used to determine the polarity of the $M_n$ signal. The $M_n$ signal is first appropriately amplified by amplifier 44 and then phase split by phase splitter 62 to provide positive and negative versions. The correct polarity is selected by polarity-selecting switch 63 in accordance with the polarity of signal 65, the output of the bipolar limiter. This corrected $M_n$ signal is added to $S_l$ in 38 to provide $\hat{S}$, signal 22.

Each of the foregoing embodiments can be used as one-dimensional or two-dimensional systems. For example, the various signals used can represent the classical raster scan of a two-dimensional image where time represents the horizontal or x dimension. In this case each of the filtering and derivative operations would be performed on the scanned signal, representing one-dimensional filtering in the horizontal or x dimension.

Although one-dimensional filtering will provide the desired noise reduction, the reduction is more effective if done in both dimensions. One approach to two-dimensional filtering is simply to reverse the scanning sequence and repeat the one-dimensional process in the other dimension. That is, once a reduced $\hat{S}$ is produced using the various filtering and derivative processes in the horizontal or x direction, the entire process is repeated in the vertical or y dimension starting with the processed $\hat{S}$ signal. In this way, further noise reduction will be achieved.

Over and above this sequential procedure, the entire operation in each embodiment can be performed in two dimensions. The low pass and high pass filter operations can be two-dimensional filters, with the derivative operations represented by the sum of partial derivatives in each dimension as given by $$\left( \frac{\partial}{\partial x} + \frac{\partial}{\partial y} \right).$$

With both the one or two-dimensional filtering, the operations can be performed in the space or frequency domains. The operations in space represent one or two-dimensional convolutions while in the frequency domain they would represent one or two-dimensional filters on the frequency spectra of the S or M signals. It is preferable that the final estimated image $\hat{S}$ have the proper composite of low and high frequency information to create a high fidelity representation of the original S image. To accomplish this the low and high pass filters 15 and 16 should be complimentary. This means, in the frequency domain, that their normalized responses should add to unity throughout the band of interest. That is, the normalized high pass transfer function $H_n$ should be equal to $1 - H_l$ where $H_l$ is the normalized low pass transfer function. In space this effectively means that the high pass convolution function should be an impulse minus the low pass convolution function so that their sum adds up to a unit impulse.

In FIG. 2 weighted sums of the measurements are used to obtain the desired S and M signals representing the selective and reduced noise images. In many applications, nonlinear operations are performed on the measurements 9–12, prior to taking the weighted sums. For example, in many x-ray imaging systems, the $A_i$ signals correspond to the line integrals of the attenuation coefficient taken under different conditions. Since the intensity measurements themselves are the exponents of these line integrals, a log operation is required to extract the desired line integral. Therefore the $A_i$ signals can represent the log of the measured intensities. Another nonlinear operation relates to the corrections for beam hardening. Measurements with broad x-ray spectra provide nonlinear renditions of the desired line integrals. These can be corrected using nonlinear operations such as quadratic and cubic powers of the logs of the intensity measurements. Therefore, in FIG. 2, a variety of nonlinear operations can be placed between the actual measurements and the inputs to weighted summers 13 and 14.

One very significant application of this invention is dual-energy CT. This system is described in U.S. Pat. No. 4,029,963 and in the previously cited publication by R. E. Alvarez and A. Macovski. In this system projection measurements are made at low and high energies. These are nonlinearly processed to provide projection signals representing the line integrals of the photoelectric and Compton components of the attenuation coefficients. Equivalently, projections are developed of the equivalent amounts of aluminum and plastic in the object, these being linear combinations of the Compton and photoelectric components. When these projections are reconstructed into CT images, as shown in the previous publications, they indicate the average atomic and density of each element of the cross section. This information has significant diagnostic value. For example, the presence of calcium, a relatively high atomic number material, can be used to distinguish benign from malignant lesions.

Unfortunately these reconstructions, especially the photoelectric or aluminum equivalent image, are excessively noisy. The present invention has been found to profoundly improve the SNR of these images. The noise reducing algorithm can either be applied to the projections themselves or to the final reconstructed images.

Referring to FIG. 2, signal 17 can represent the equivalent aluminum or plastic projection or image formed by nonlinear processing of the two measurements. Signal 18 is a weighted sum of the aluminum and plastic images providing optimum SNR. In a paper by R. E. Alvarez and E. Seppi, "A Comparison of Noise and Dose in Conventional and Energy Selective Computed Tomography," in *IEEE Trans. Nuclear Science*, vol. 26, pp. 2853–2856, 1979, it was shown that, using optimum weightings, the SNR is maximized. This low noise M signal, 18, is then combined with the aluminum or plastic in any of the previous embodiments to profoundly improve the SNR.

As was indicated, the noise-reducing operations shown can be applied to either the projections themselves, or to the reconstructed image. If applied to the projections, the one-dimensional filtering versions of the various algorithms described are used. After appropriate noise reduction the modified projection signals Ŝ are used to reconstruct the cross-sectional images in the conventional ways, such as by convolution back projection. This approach can result in streak artifacts in the reconstruction because of the sensitivity to slight inconsistencies in the projections. To avoid these artifacts the algorithm is applied to the two reconstructed images. Here the various algorithms can be used in either their one-dimensional or two-dimensional forms.

The equivalent aluminum and plastic images derived from two energy measurements also has great value in projection imaging. Using a four quadrant weighted sum of the two components, any desired material can be eliminated from the image. Thusfar images have been made of soft tissue only with bone cancelled, and vice versa. These provide unique visualizations of the anatomy devoid of intervening materials. This system is described in the previously referenced paper by L. A. Lehmann. As with CT, these selected images are troubled by poor SNR. In FIG. 1, signals 9 and 10 can represent the aluminum and plastic components derived from the two energy measurements. Weighted summer 13 provides the desired selection of the cancelled material. Summer 14 uses the weights to provide the high SNR image which is then used to improve the selected image as previously described.

In the foregoing description x-ray images and measurements were used as examples. This noise-reducing invention can be used in any multicomponent imaging system were selected signals are derived from the measurements. For example, various NMR components such as density, $T_1$ and $T_2$ are derived from combinations of measurements. These can be applied as described to improve the SNR of these selected images.

Thusfar, the filtering operations have been linear. Low-pass filtering of noisy images tends to create relatively coarse noise, of reduced amplitude, which can be annoying in certain circumstances. This can be alleviated through the use of nonlinear filtering. For example a median filter can be used which, for a group of pixels, picks that pixel value for which there are an equal number of greater and lesser values. The median filter has many nice properties including the suppression of impulsion noise and the preservation of edges.

The median filter, however, is low pass in nature and will suppress many desired structures such as narrow vessels. Therefore, if the desired processed signal S is median filtered, components of the lower noise processed signal M should be added to restore the fidelity. As before, since the M signal has lower noise, the resultant estimate Ŝ will be of significantly reduced noise as compared to S. The added components of the M signal are those which are normally suppressed by median filtering and can be expressed as $M - M_m$ where the subscript m represents median filtering. Thus the estimate of Ŝ is given by $$S = S_m + M - M_m$$

As before, this signal will both restore the fine structures lost in the $S_m$ image, and also have undesired fine structures wherever M has fine structures. These can be suppressed, as before, by multiplying $M - M_m$ by some appropriate factor which indicates the presence of fine structures in the S signal.

Figure 8:
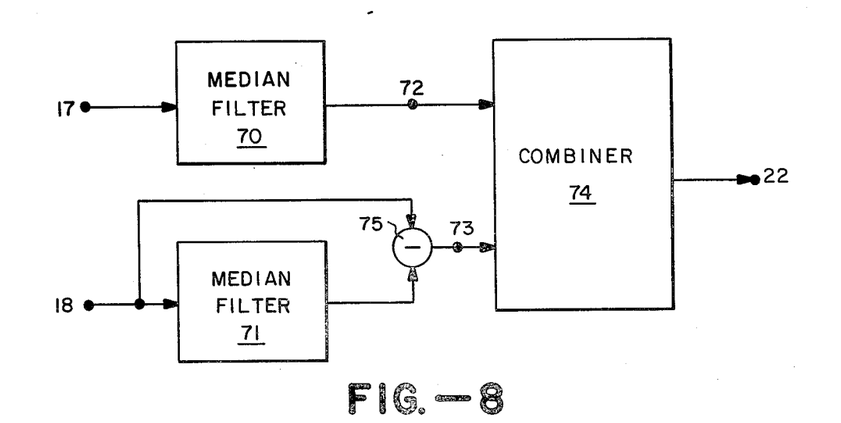
FIG. 8 is a block diagram of an embodiment using median filtering.
Figure 9:
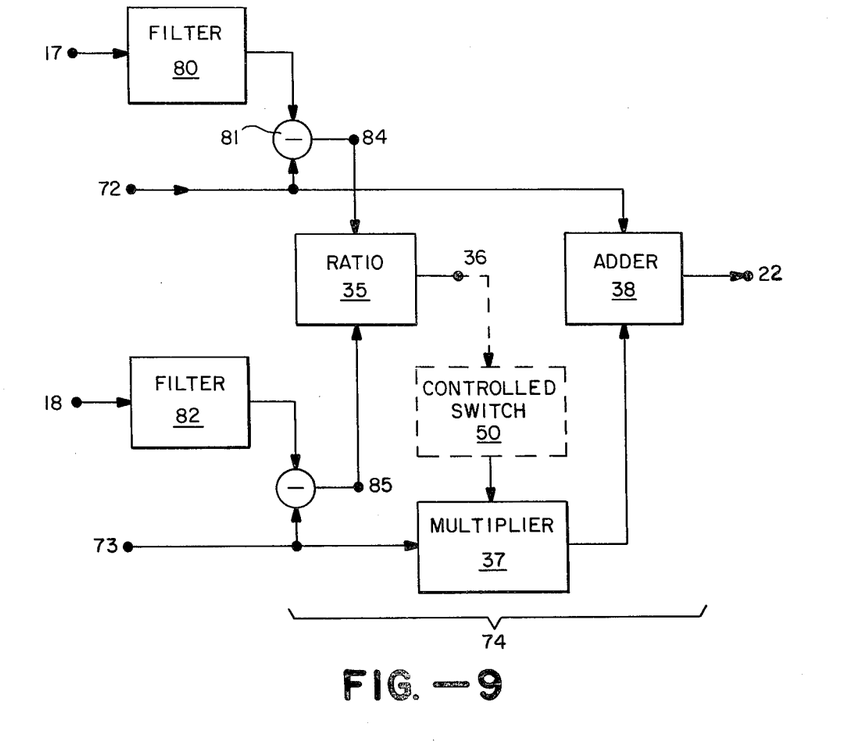
FIG. 9 is a block diagram of a combiner for the median filter embodiment.
Figure 10:
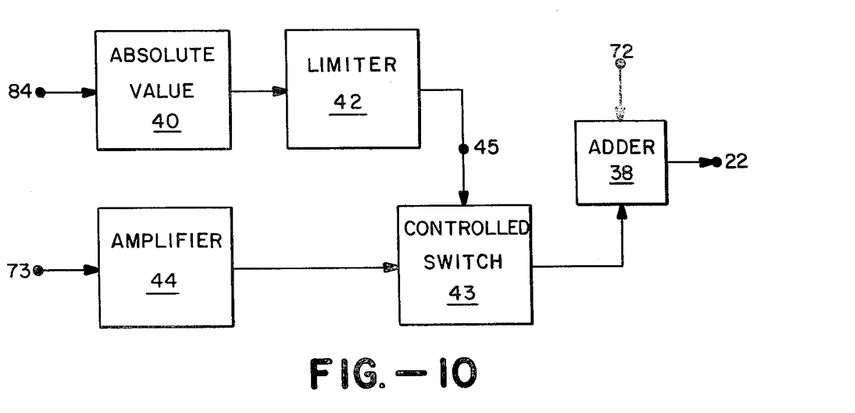
FIG. 10 is a block diagram of an alternate embodiment of a combiner.

This approach is illustrated in FIGS. 8, 9 and 10. In FIG. 8, analogous to the previous system, filter 70 provides signal 72, $S_m$, and filter 71, in general identical to filter 70, provides $M_m$ which, when subtracted from signal 18 in subtractor 75 provides signal 73, $M-M_m$. As before combiner 74 can simply represent the sum of the two signals. Alternatively, the combiner can attempt to add signal 73, $M-M_m$, in the presence of the fine structure of the desired signal S.

One method of accomplishing this is shown in FIG. 9. Here signal 84 represents an operation on $S_l$ which will indicate the presence of fine structures and be relatively noise immune. One approach is a signal $S_l-S_m$ where S is filtered in low-pass filter 80 to provide $S_l$ from which $S_m$ is subtracted. Small structures will have a larger component in $S_l$ than $S_m$, resulting in the desired signal. Alternatively filter 80 can be a median filter operating over a smaller region than that of filter 70. For example, filter 70 can find the median over $5 \times 5$ pixels and filter 80 over $2 \times 2$. In that case signal 84 will be $S_{m1}-S_m$, where m1 is the smaller median filter which contains components of the desired fine structure.

The identical filtering is applied to M signal 18 to provide either $M_l-M_m$ or $M_{m1}-M_m$. Thus the ratio is taken of either $(S_l-S_m)/(M_l-M_m)$ or $(S_{m1}-S_m)/(M_{m1}-M_m)$. These ratios should represent the desired amount for fine structure information $M-M_m$, signal 73, to be added to $S_m$, signal 72. Although the subtracted signals in each case were $S_m$ and $M_m$ respectively, these can be different median filters than those of 70 and 71.

The ratio signal 36 is used to control multiplier 37 which determines the amplification of signal 73, $M-M_m$. As shown, the amplified $M-M_m$ signal is added to $S_m$, signal 72, in adder 38 to provide signal 22, $\hat{S}$, the reduced-noise estimate of S. The ratio signal 36 is applied to multiplier 37 through controlled switch 50, as in FIG. 2. This is again to account for those situations where the ratio output is unreliable. As with FIG. 4, when either input to ratio structure 35, 84 or 85, is below a certain threshold, the ratio signal 36 is disabled. Also, when the ratio output itself, signal 36, exceeds a given level, the ratio signal is disabled. As previously indicated, the disabling operation can either provide a fixed gain or zero gain for amplifier 37.

FIG. 10 is analogous to FIG. 6 where components of the S signal itself are used to gate in the fine structure components of the $M-M_m$ signal. Here signal 84, representing $S_l-S_m$ or $S_{m1}-S_m$ is used to indicate the regions where fine structure exists. Since this is a bipolar signal, its absolute value is calculated in structure 40. It is then clipped in limiter 42 and used to gate in the appropriately amplified $M-M_m$ signal 73 in the desired regions only. This is added to $S_m$ in adder 38 to provide signal 22, $\hat{S}$. As with the linear filtering operations, the median filtering can be one or two-dimensional.

Although a number of embodiments of the invention have been described, the basic operation is the same. Given a number of measurements, or initially processed measurements, a weighted sum S is taken to provide a desired selective feature. In addition, a weighted sum M is taken which, although nonselective, has a greater signal-to-noise ratio for the component of interest. These are combined as follows to provide an improved estimate of S, $\hat{S}$, as given by $$\hat{S} = S_f = C\, M_{\bar{f}}$$

where $S_f$ is the filtered S signal and $M_{\bar{f}}$ is the M signal filtered in a complementary manner as defined by $$S = S_f + S_{\bar{f}}$$

The constant C is a control function which can take a variety of forms. In its simplest form, C=unity. In this case $\hat{S}$ provides an improved SNR with some filtered artifacts remaining. Another choice for C involves an attempt at selecting the desired $M_{\bar{f}}$ components only where $M_{\bar{f}}$ components are needed, so as to minimize the $M_{\bar{f}}$ artifacts. One measure of where they are needed uses an $S-S_f$ signal. However, since this is, in general, a noisy signal, some additional filtering is required. One example is $S_{f1}-S_{f2}$ where f1 and f2 have the same general filtering form as that of f, but are more severe thus reducing the noise. $\dot{S}_l$, previously described, is a signal of this general type which indicates the presence of edges.

Given a filtered form of $S-S_f$, the C function can be a limiting function which is unity where the magnitude of $S-S_f$ exceeds some threshold. A more accurate form is given by, $$C = \frac{S_{f1} - S_{f2}}{M_{f1} - M_{f2}}$$

where the ratio indicates the position and amplitude of the desired edge signals.

One of the general problems of this system is that, although the noise is significantly reduced, its visual character can be undesirable. For example, if $\hat{S}$ is made up of $S_l$, a low-pass filtered image, the resultant noise texture can be displeasing even though the noise power is reduced. To minimize this problem $S_f$ can be chosen to have a relatively narrow autocorrelation peak, corresponding to a relatively flat power spectrum and thus fine-textured noise. These filters can be realized by convolving with various one or two-dimensional functions. These include a random dot array, an annulus, and an array of concentric annuli with alternate polarities. Again, a filtered ratio of $(S-S_f)/(M-M_f)$ can be used to control the addition of $M_{\bar{f}}$. With these filters, the amount of filtering required to achieve the desired noise reduction is less severe. Therefore proportionately less of the M signal is used, thus minimizing the possibility of artifacts.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. For use in an imaging system, a method for reducing the noise of a first processed image of an object representing a desired parameter derived from a plurality of measurements the steps of:
    processing said plurality measurements to provide a second processed image having greater signal-to-noise ratio than said first processed image;
    filtering said first processed image to reduce its noise;
    filtering said second processed image with a filter complementary to the filter used on said first processed image; and combining said filtered first processed image and said filtered second processed image to provide a reduced noise version of said first processed image.

2. The method as described in claim 1 wherein the combining step includes the step of adding the filtered components of said second processed image to said filtered first processed image.

3. The method as described in claim 1 wherein the combining step includes the step of adding the filtered components of said second processed image in an amount determined by said first processed image.

4. The method as described in claim 3 wherein the combining step includes the step of multiplying the filtered components of said second processed image by the filtered first processed image.

5. The method as described in claim 4 including the step of limiting said filtered first processed image.

6. The method as described in claim 3 including the step of multiplying the filtered components of the second processed image by the ratio of a secondarily filtered first processed image, filtered so as to indicate the presence of the missing components of the filtered first processed image, and the second processed image filtered in substantially the same manner.

7. The method as described in claim 6 including the step of nonlinearly restricting the ratio in regions where at least one of the magnitudes of the secondarily filtered first and second processed images are below a preset threshold.

8. A method for providing an improved processed image from a plurality of x-ray measurements comprising the steps of:
deriving the low frequency portion of the processed image from functions of a first weighted sum of the measurements at different x-ray energies; and
deriving the remainder of the frequency components from functions of a second weighted sum of the measurements having an improved signal-to-noise ratio.

9. Apparatus for providing a reduced noise version of a an image of an object formed by a plurality of measurements comprising:
means for combining the plurality of measurements to provide an image signal;
means for low pass filtering the image signal to provide a first processed image signal;
means for combining the plurality of measurements to provide a lower noise processed image signal;
means for high pass filtering the lower noise processed image to provide a second processed image signal; and
means for combining said first and second processed image signals whereby a reduced noise version of the image signal is obtained having substantially the fidelity of the original image signal.

10. Apparatus as described in claim 9 wherein the means for combining the first and second processed image signals includes means for adding said processed image signals.

11. Apparatus as described in claim 9 wherein the means for combining the first and second processed image signals includes means for adding amounts of the second processed image signal to the first processed image signal with the amounts determined by the first processed image signal.

12. Apparatus as described in claim 11 wherein the means for determining the amounts of the second processed image signal added to the first processed image signal includes means for multiplying the second processed image signal by the first processed image signal.

13. Apparatus as described in claim 12 including means for limiting the first processed image signal.

14. Apparatus as described in claim 12 including means for taking the derivative of the first processed image signal prior to limiting.

15. Apparatus as described in claim 11 including means for determining the correct polarity of the added amounts of the second processed image signal prior to being added to the first processed image signal.

16. Apparatus as described in claim 15 where the polarity determining means include means for taking the product of the derivative of a low pass filtered version of the image signal and the derivative of a low pass filtered version of the lower noise processed image and utilizing the polarity of the product to determine the polarity of the added second processed image signal.

17. Apparatus as described in claim 11 wherein the means for determining the amounts of the second processed image signal added to the first processed image signal includes means for multiplying the second processed image signal by the ratio of the derivative of a low pass filtered version of the image signal to the derivative of a low pass filtered version of the lower noise processed image.

18. Apparatus as described in claim 11 wherein the multiplication by the ratio is disabled and a fixed proportion of the second processed image signal is added when any one of the input or output signals of the ratio system are outside present levels.

19. Apparatus as described in claim 18 wherein the disabling occurs when the magnitude of the derivative of the low pass filtered version of the processed signal signal is below a preset level.

20. Apparatus as described in claim 18 wherein the disabling occurs when the magnitude of the derivative of the low pass filtered version of the lower noise processed image signal is below a preset level.

21. Apparatus as described in claim 18 wherein the disabling occurs when the magnitude of the ratio is above a preset level.

22. Apparatus as described in claim 18 where the fixed proportion of the second processed image is zero.

23. Apparatus as described in claim 18 where the fixed proportion of the second processed image signal is the correct high frequency component of the reduced noise version of the processed image signal.

24. Apparatus as recited in claims 9, 11, 12, 17 or 18 wherein the filtering and derivative operations are one-dimensional operations performed on one-dimensional signals formed by sequencing through each of the processed image signals.

25. Apparatus as recited in claims 9, 11, 12, 17, or 18 wherein the filtering operations are two-dimensional operations performed on each of the stored two-dimensional processed images.

26. Apparatus as recited in claim 9 wherein the plurality of measurements are x-ray intensity measurements of x-rays transmitted through an object.

27. Apparatus as recited in claim 26 wherein each of the plurality of x-ray measurements are taken at different x-ray energy spectra.

28. Apparatus as recited in claim 27 wherein the image signal represents the elimination of one or more materials in the object and is formed by a weighted sum of the measurements at different energies and the lower noise processed image signal is formed by a different weighted sum which provides improved signal-to-noise ratio for the material of interest in the object.

29. Apparatus as recited in claim 26 wherein the plurality of x-ray measurements include measurements taken with and without administered contrast material in the object.

30. Apparatus as recited in claim 26 wherein the plurality of x-ray measurements include measurements taken at different energies with and without administered contrast material with the processed image formed by taking a weighted sum of the measurements which isolates the contrast material and where each set of measurements at different energies eliminates at least one material component in the object.

31. Apparatus as recited in claim 30 wherein the lower noise processed image signal is formed using a weighted sum of the measurements at different energies taken in the presence of the contrast material.

32. Apparatus as recited in claim 30 wherein the lower noise processed image signal is formed using a weighted sum of the measurements which isolates the contrast material by taking the difference between positively weighted sums of the measurements taken with and without the contrast material.

33. Apparatus as recited in claim 27 wherein the reduced noise processed image signal is a computerized tomography image generated by reconstruction from reduced noise projections formed by the plurality of x-ray measurements at different energy spectra.

34. Apparatus as recited in claim 27 wherein the image signal is a computerized tomography image generated by reconstructed from combinations of the measured projections and the lower noise processed image is a computerized tomography image generated by reconstruction of different combinations of the measured projections whereby the combining of the first and second processed image signals to obtain a reduced noise processed image signal is accomplished using reconstructed image signals.

35. Apparatus as recited in claims 9, 11, 12, 17 or 18 wherein the low pass filter used for the image signal and the high pass filter used for the lower noise processed image signals are complementary filters with the sum of their normalized spectral responses being substantially unity over the spectrum of interest.

36. Apparatus for providing a reduced noise version of a processed image of an object formed by a plurality of measurements comprising:
   means for combining the plurality of measurements to provide said processed image;
   means for median filtering the processed image to provide a first processed image;
   means for combining the plurality of measurements to provide a lower noise processed image;
   means for subtracting a median filtered lower noise processed image from the lower noise processed image to provide a second processed image; and
   means for combining the first and second processed images whereby a reduced noise version of the processed image is obtained having substantially the fidelity of the original processed image.

37. Apparatus as recited in claim 36 wherein the means for combining the first and second processed images includes means for adding said processed images.

38. Apparatus as recited in claim 36 wherein the means for combining the first and second processed images includes means for adding amounts of the second processed image to the first processed image with the amounts determined by the first processed image.

39. Apparatus as recited in claim 38 wherein the amount of the second processed image added is determined by the ratio of a signal representing the fine structure of the processed image to a signal representing the fine structure of the lower noise processed image.

40. Apparatus as recited in claim 39 wherein the fine structure signals are formed by the difference between a low passed filtered version and a median filtered version of each signal.

41. Apparatus as recited in claim 39 wherein the fine structure signals are formed by the difference between a smaller median filtered version and a larger median filtered version of each signal.

* * * * *

UNITED STATES PATENT AND TRADEMARK OFFICE
CERTIFICATE OF CORRECTION

PATENT NO. : 4,463,375

DATED : July 31, 1984

INVENTOR(S) : ALBERT MACOVSKI

It is certified that error appears in the above-identified patent and that said Letters Patent is hereby corrected as shown below:

Column 1, line 5, after the title, insert the following paragraph:

--This invention was made with Government support under contract ecs78-23307 awarded by the National Science Foundation. The Government has certain rights in this invention.--

Signed and Sealed this

Ninth Day of May, 1995

Attest:

BRUCE LEHMAN

*Attesting Officer*     *Commissioner of Patents and Trademarks*